United States Patent [19]

Dickson

[11] Patent Number: 4,748,316
[45] Date of Patent: May 31, 1988

[54] OPTICAL SCANNER FOR READING BAR CODES DETECTED WITHIN A LARGE DEPTH OF FIELD

[75] Inventor: LeRoy D. Dickson, Raleigh, N.C.

[73] Assignee: International Business Machines Corporation, Armonk, N.Y.

[21] Appl. No.: 873,934

[22] Filed: Jun. 13, 1986

[51] Int. Cl.[4] .......................... G06K 7/10; G06K 7/14
[52] U.S. Cl. ..................................... 235/454; 235/457
[58] Field of Search ............................ 235/467; 382/66

[56] References Cited

U.S. PATENT DOCUMENTS

| | | | |
|---|---|---|---|
| 3,522,437 | 8/1970 | Bargh | 382/66 |
| 3,534,332 | 10/1970 | Parks | 382/66 |
| 3,673,566 | 6/1972 | Reede | 382/66 |
| 4,160,237 | 7/1979 | McMahon | 382/66 |
| 4,224,509 | 9/1980 | Cheng | 235/467 |

Primary Examiner—Harold I. Pitts
Attorney, Agent, or Firm—Gerald R. Woods

[57] ABSTRACT

This disclosure describes a technique for reading bar codes scanned by focussed scan lines having different focal lengths where at least one of the scan lines has a beam that is small relative to irregularities of the surface on which the label appears. The scan lines are generated using a holographic disk so as to have a predetermined focal length and focal zone. The focal zone of each generated scan line overlaps the focal point of at least one adjacent scan line. Any bar code label which might be scanned by a beam so small that it would be degraded by surface scatter noise is also scanned by a slightly larger beam. The slightly larger beam "averages out" the surface scattering noise to produce a smoother or cleaner return signal.

6 Claims, 3 Drawing Sheets

OPTICAL SCANNER FOR READING BAR CODES DETECTED WITHIN A LARGE DEPTH OF FIELD

TECHNICAL FIELD

The present invention relates to optical scanners and more particularly to an optical scanner capable of reading high density bar codes over a wide range of distances from the scanner.

BACKGROUND OF THE INVENTION

Optical bar code scanners are being used for a number of different purposes. The best known application for such scanners is in retail checkout operations at supermarkets or mass merchandisers. In retailing environments, the scanner detects a bar code printed on or attached to a product being checked and uses the bar coded information to retrieve the identity and current price of the product from a system memory. The current price and product identity are used primarily to prepare customer receipts and to record transaction totals. The information may also be used for other purposes. For example, the product identity may be used in an inventory control system to track current stocks of the particular product and to automatically reorder the product when the stock falls below a threshold level.

Optical bar code scanners are also used in industrial and/or manufacturing environments for a number of different purposes. One use of a bar code scanner in such an environment is to track incoming or outgoing labelled materials to control the routing of the materials through an automated conveyer system. Another use is to track labelled parts or subassemblies on an assembly line to assure that the proper parts and subassemblies are available at the times and places needed for final assembly of an end product, such as an automobile. There are many other uses for optical bar code scanners in industrial/manufacturing environments.

Because there are fundamental differences between the requirements of retailing and industrial/manufacturing environments, the same type of optical bar code scanner is not necessarily suitable for use in both kinds of environments. In the retailing environment, the product carrying the bar code label can usually be physically positioned relative to the scanner by the checkout stand operator. Therefore, it is not generally considered critical that a checkout scanner be capable of reading bar code labels at widely varying distances from the scanner surface.

In an industrial/manufacturing environment, it is not always possible for a bar code label to be brought within a limited range of distances from a scanner. In such an environment, the item carrying the bar code label may be too heavy or bulky to allow the item to be repositioned solely for the purpose of bringing the bar code label closer to the scanner. In some automated systems, an operator may not be available to reposition an item even where it might be physically feasible to do so.

Different techniques have been adopted in attempts to solve problems encountered in attempting to read bar code labels in an industrial/manufacturing environment. Where the label can't be brought to the scanner, the simplest approach is to bring the scanner to the label by using a hand-held or portable scanner. One problem with this approach is that a label may not located in an easily accessible spot on the item being tracked. Another problem is that an operator must always be available to perform what is basically a mechanical function; namely, maneuvering the hand-held scanner into a position in which the label can be read.

Because hand-held scanners are not well suited for certain industrial/manufacturing applications, attempts have been made to use fixed position scanners for some purposes. Because the distance between the label and the scanner may vary widely in such environments, a fixed position scanner must be designed to have a large depth of field. The "depth of field" of a scanner is the range of distances over which the scanner can successfully read the smallest bar code label allowed by the standards authority for the particular bar code being read. For example, The Uniform Products Code Council issues specifications requiring that UPC (Universal Product Code) labels be no smaller than a predetermined minimum size.

Known scanners employ rotating beam deflectors capable of generating multiple scan lines having different focal lengths; that is, focussed at points at different distances from the scanner. It has been suggested that the depth of field of such a scanner can be maximized by fabricating the beam deflector to focus different scan lines so that the depths of field or focal zones for different scan lines meet but do not overlap substantially. The combined focal zones will provide a continuous depth of field of significant range for the scanner.

One problem with the suggested approach is that the size of the focussed spot must be kept small enough to be able to read the smallest allowable bar code label when that label is detected at the focal point of the scan line having the longest focal length. Since the size of the scanning beam at the beam deflector is fixed, the size of a focussed beam at its focal point is proportional to the focal length of the beam. The sizes of the focussed spots for scan lines having focal lengths shorter than the maximum focal length are necessarily smaller than the size of the focussed spot for the scan line with the longest focal length.

For lines having short focal lengths, the spot size may actually be small in comparison to irregularities of the surface on which the bar code label appears. The surface irregularities may be due to the normal texture of the medium (usually paper) on which the label is printed or may be created by the process of printing the label. Considerable irregularities are produced, for example, when a dot matrix printer is used to produce a bar code label.

If the surface on which a bar code label appears is relatively smooth, a significant part of the optical energy in the impinging light beam is returned or reflected back along the path of the light beam. Returned light eventually reaches and is detected by a photodetector. The photodetector generates an electrical signal having a time varying value dependent primarily on the reflectivity of the surface being crossed by the beam.

If the surface is irregular relative to the size of the beam, however, significant scattering of the optical energy can occur. The portion of the beam returned to the photodetector includes a noise or jitter component as a result of the irregular and intermittent scattering losses. The returned optical signal is degraded by the scattering noise, making it difficult to perform the signal processing operations needed to locate and correctly decode the bar code in the stream of electrical signals produced by the photodetector.

SUMMARY OF THE INVENTION

The present invention is an optical scanner capable of reading high density bar codes over a wide range of distances from the scanner notwithstanding the spot size of the scan beam may be small for some scan lines relative to irregularities of the surface on which the label appears.

A scanner constructed in accordance with the present invention includes a coherent light beam source and a beam deflector capable of deflecting and focussing the light beam to produce at least one set of scan lines. Some of the scan lines in each set have different focal lengths. The beam deflector is fabricated so that each of the scan lines has a focal zone which overlaps the focal point of at least one of the other scan lines in the set.

Because the scanner operates with scan lines having intentionally overlapping focal zones, a high density bar code located almost anywhere in the overall depth of field of the scanner is read by at least two scan lines. If the label is being scanned by a small or highly focussed beam of one of the scan lines, the returned optical signal may be degraded by optical noise due to the surface scattering. However, the label will also be scanned by at least one other scan line that is necessarily slightly defocussed relative to the first scan line. The slightly defocussed scan line "averages out" noise due to surface scattering and thus produces a return signal that is not degraded by surface scattering.

BRIEF DESCRIPTION OF THE DRAWINGS

While the following technical description of the invention concludes with claims particularly pointing out and distinctly claiming that which is regarded as the present invention, details of a preferred embodiment of the invention may be more readily ascertained from the technical description when it is read in conjunction with the accompanying drawings wherein:

TECHNICAL DESCRIPTION

Figure 1:
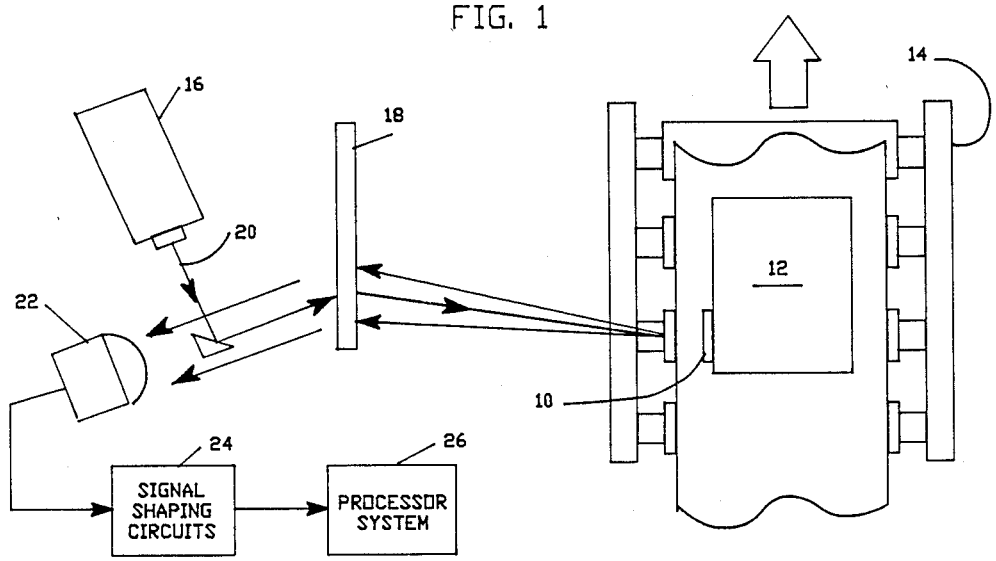
FIG. 1 is a top view of an industrial scanner including the major components of a system capable of practicing the present invention.

Referring to FIG. 1, a system into which the present invention can be incorporated is a label reading system for reading a bar code label 10 attached to an item 12 shown as being transported on a conveyor 14. The label reading system includes a coherent light source or laser 16 and a rotating beam deflector. The beam deflector preferably takes the form of a rotating, multi-faceted holographic disk 18 of the type generally described in U.S. Pat. No. 4,415,224, which is assigned to the assignee of the present invention. The disk 18 carries one or more sets of holographic optical elements or facets.

Each facet serves the dual function of deflecting an impinging laser beam 20 to generate a scan line and of focussing the beam 20 to a predetermined point in space. The distance between the surface of disk 18 and the point in space is, of course, the focal length of the scan line. To implement the present invention, the facets in disk 18 must be fabricated so the focal lengths of individual scan lines in a set of such lines bear a predetermined relationship to the focal lengths of other scan lines in the set. The details of the relationships are discussed later.

Some of the optical energy reflected from the label 10 is returned through the disk 18 and onto a photodetector 22, which generates the electrical equivalent of the returned optical signal. The electrical signal is applied to signal shaping circuits 24 which perform thresholding and other conventional signal filtering operations to generate a square wave pulse train. When the beam 20 is actually crossing the label 10, the length of the pulses at least nominally represent the width of the bars and spaces in the label. The square wave pulse train is applied to a processor system 26 capable of isolating the bar code information in the pulse train and of decoding that information to establish the coded values.

The actual sizes and shapes of labelled items passing an optical scanner in an industrial or manufacturing environment will vary greatly. The distance between the scanner and the bar code label attached to those items will also vary greatly. The ability of a scanner to read high density bar codes is enhanced by using scanning beams with different focal lengths. In order to read the smallest allowable bar code label at the greatest permissible distance from the scanner, it is necessary to limit the size of the beam at the focal point of the scan line having the longest focal length.

Figure 2:
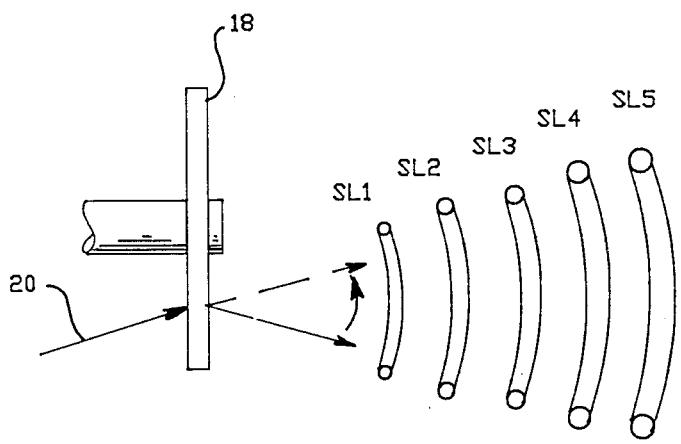
FIG. 2 is an illustration of several scanning beams, showing the relationship between focal lengths and spot sizes.

Referring to FIG. 2, which it must be emphasized is not to scale, five different scan lines SL1, SL2, SL3, SL4 and SL5 are illustrated. The diameter of the scanning beam at the focal point of each of the five scan lines is represented by the circles at each end of the scan lines. The laser beam 20 which impinges on disk 18 is fixed in size by the optical components in the label reading system. If scan line SL5 has the maximum allowable beam size at its focal point, the fixed size of beam 20 dictates that the beam size at the focal points of any scan lines with shorter focal lengths than SL5, such as scan lines SL1 through SL4, will necessarily be smaller than the beam size at the focal point of scan line SL5. The diameter of the beam at the focal point of a scan line will be a function of the relative focal lengths for the scan lines. For example, if the focal length of scan line SL5 is five times as great as the focal length of scan line SL1, the diameter of the beam at the focal point of scan line SL1 will only be 1/5 or 20% as large as the diameter of the beam at the focal point of scan line SL5.

Figure 3:
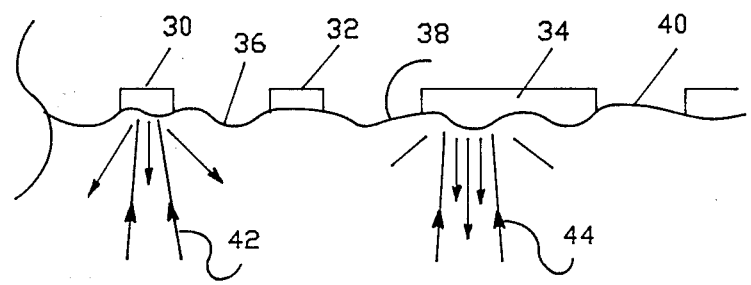
FIG. 3 represents the effects of surface irregularities for scanning beams of different sizes.
Figure 5:
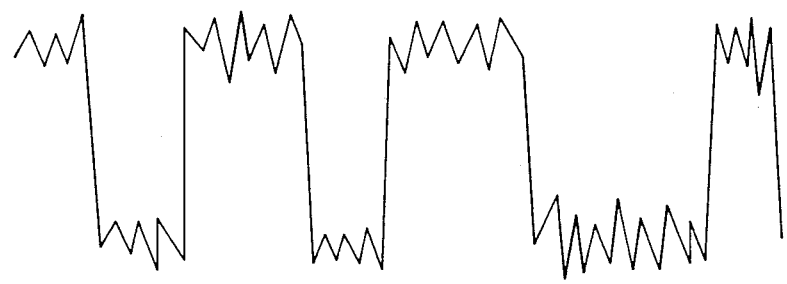
FIG. 5 is a representative waveform generated when a surface is scanned with a beam having a small spot size relative to the surface irregularities.

FIG. 3 illustrates the relationship between beam size, surface irregularities and the optical signals which are generated. Two beams of different sizes are directed at a textured surface on which a bar code (represented by bars 30, 32, and 34 and spaces 36, 38 and 40) has been printed. Beam 42 is relatively small in comparison to the irregularities in the surface. As beam 42 traverses the surface, the amount of optical energy that is reflected back along the path of beam 42 at a given time will depend not only on the reflectivity of the surface but also on the amount of energy that is lost due to scattering by the surface irregularities. The scattering losses will vary rapidly and irregularly with changes in the surface, imposing a noise or jitter component into the reflected signal that is ultimately seen by the photodetector in the scanner. FIG. 5 shows the "noisy" waveform which can be generated when a surface is scanned by a relatively small diameter beam. Because the noise degrades the returned signal, incorrect thresholding or smoothing of the degraded signal by signal processing circuits may occur, preventing the label from being read and decoded correctly.

Figure 6:
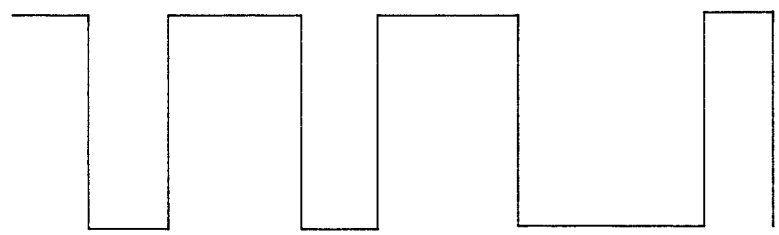
FIG. 6 is a representative waveform generated when the same surface is scanned with a beam having a spot size which is larger relative to the surface irregularities.

When a larger diameter beam 44 scans the same surface, however, the impact of the surface irregularities on the return signal will be considerably lessened. While scattering still takes place, the larger beam "averages out" the rapid variations due to scattering, resulting in a smoother return signal. FIG. 6 represents a smooth or clean waveform that would be generated when the surface shown in FIG. 3 is scanned by a relatively large beam, such as beam 44. The present invention relies on the fact that a holographic disk can be fabricated to produce a set or pattern of scan lines wherein the focal zone of each scan line overlaps the focal point of at least one other scan line. The overlap in focal zones assures that a bar code label detected substantially anywhere in the combined or overall depth of field of the scanner will fall within the focal zones of at least two scan beams. If the first of the two beams is so small that the return signal which it generates is degraded by noise, as might occur at or near the focal points of scan lines having short focal lengths, the second of the two beams will necessarily be somewhat larger than the first beam since the label cannot simultaneously appear at the focal point of two scan lines having different focal lengths. The second, larger beam will generate a return signal from which the noise component is averaged out. Thus, even if the signal produced by the first beam is so degraded by noise as to be unusable, the signal produced by the second beam should allow detection and decoding of the bar code label.

The focal lengths of the scan lines generated by the disk 18 are established during the manufacture of the disk. The individual facets on the disk are constructed using known off axis holographic techniques which will permit reconstruction of beams having known focal lengths. The optical geometry of reference and object beams is changed during the process of exposing the photosensitive material in the facets using well known techniques.

Figure 4:
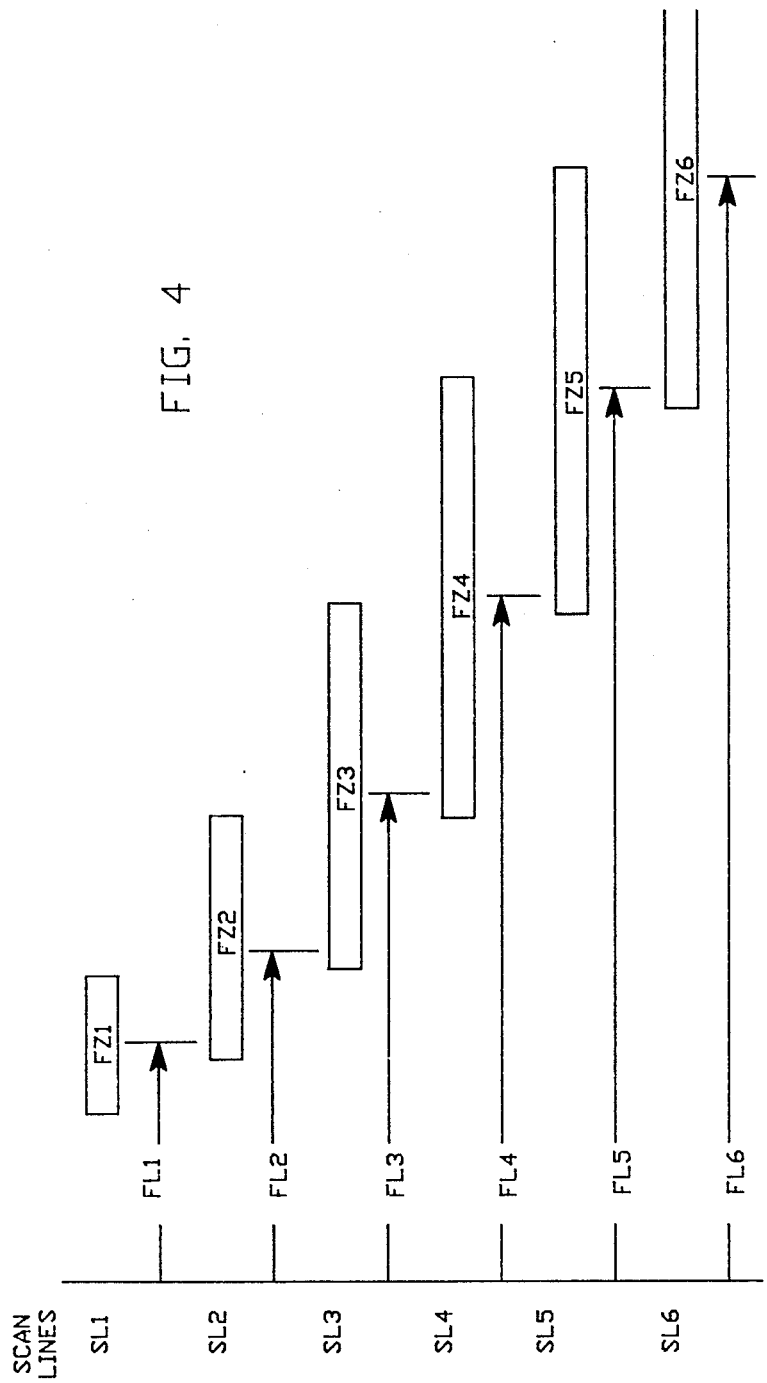
FIG. 4 is a schematic illustration of the properties which a scanner beam deflector must possess in an implementation of the present invention.

The properties which a holographic disk must have in order to implement the present invention are illustrated in FIG. 4 for a set of six scan lines. Six scan lines are shown in the set only for purposes of illustration. In practice, a set would probably consist of a greater number of scan lines. Each of the facets in the set would be generated using known off axis holographic techniques to produce a scan beam having a particular focal point FPx where x is the number of the scan line. The focal length of each scan line is identified as FLx where x is the number of the scan line.

Each scan line generated by one of the facets in the set will have a focal zone FZx centered on the focal point for the scan line. The diameter of the generated scan beam anywhere within the focal zone for a given scan line will be small enough to discriminate between the bars and the spaces in the bar code label being scanned. The focal zones for scan lines with short focal lengths will be relatively shorter than the focal zones for scan lines with longer focal lengths. This is because a facet will cause a beam with a short focal length to converge more rapidly toward the focal point and to diverge more rapidly beyond the focal point.

It will be seen that the focal zone for any one scan line overlaps the focal point for at least one other scan line. In fact, for scan lines other than the shortest and longest focal length lines in a set, the focal zone of a given scan line overlaps the focal points of both adjacent lines. For example, the focal zone FZ4 of scan line SL4 overlaps the focal points FP3 and FP5 of both adjacent scan lines SL3 and SL5.

While there has been described what is considered to be a preferred embodiment of the invention, variations and modifications in the preferred embodiment will occur to those skilled in the art once they are made aware of the basic concepts of the invention. Therefore, it is intended that the appended claims shall be construed to include not only the preferred embodiment but all such variations and modifications as shall occur to those skilled in the art.

What is claimed is:

1. An optical scanner for reading bar code labels at different distances from the scanner, said scanner including a coherent light beam source and a beam deflector capable of deflecting and focussing the light beam to produce a set of scan lines, each of the scan lines having a focal zone which overlaps the focal point of at least one other of said scan lines, said beam deflector producing a scan spot in the focal zone closest to the deflector which is relatively small in comparison to irregularities of the surface on which the bar code label appears.

2. An optical scanner as defined in claim 1 wherein the focal zone of a particular scan line is defined as the region within which the scan spot is sufficiently small to be able to discriminate between the bars and spaces of the smallest allowable bar code label intended to be read by the scanner.

3. An optical scanner as defined in claim 2 wherein successive scan lines produced by said beam deflector have successively longer focal lengths.

4. An optical scanner as defined in either of claims 2 or 3 wherein said beam deflector comprises a rotating disk having a plurality of adjacent holographic facets, each of said facets being capable of focussing the light beam at a predetermined distance from the facet.

5. For use in an optical scanner of the type including a coherent light beam source and a beam deflector capable of deflecting and focussing the light beam to produce a set of scan lines, each focussed at a different predetermined focal length, a method for reading bar coded labels to minimize reading problems associated with optical noise resulting from scattering from the surface on which the label appears, said method comprising the step of scanning the label with at least two different scan lines while the label is within the focal zone of both of said scan lines, the scan spot in at least one of the scan lines generated by the deflector being relatively large in comparison to irregularities of the surface on which the label appears.

6. A method as defined in claim 5 wherein said scanning step further comprises the step of scanning the label with scan lines having progressively longer focal lengths.

* * * * *